United States Patent [19]

NakaMats

[11] Patent Number: 5,096,284
[45] Date of Patent: Mar. 17, 1992

[54] SPECTACLES HAVING REARWARD SECURING MEMBERS

[76] Inventor: Yoshiro NakaMats, 1-10-1105, Aoyama 5-chome, Minato-ku, Tokyo, Japan

[21] Appl. No.: 511,670

[22] Filed: Apr. 20, 1990

Related U.S. Application Data

[62] Division of Ser. No. 317,312, Mar. 1, 1989, abandoned.

[51] Int. Cl.⁵ .......................... G02C 5/20; G02C 5/14
[52] U.S. Cl. .................................. 351/123; 351/118; 351/156
[58] Field of Search ............... 351/123, 156, 157, 158, 351/119, 118; 24/3 C; 2/448, 449, 450

[56] References Cited

U.S. PATENT DOCUMENTS

| | | | |
|---|---|---|---|
| 2,946,394 | 7/1960 | Smith | 351/158 X |
| 3,741,635 | 6/1973 | Wortman | 351/123 |
| 3,953,114 | 4/1976 | Bidgood | 351/123 |
| 4,902,120 | 2/1990 | Weyer | 351/158 |

FOREIGN PATENT DOCUMENTS 1295891 12/1962 France ........................ 351/123

*Primary Examiner*—Rodney B. Bovernick
*Attorney, Agent, or Firm*—Jordan and Hamburg

[57] ABSTRACT

The present invention provides a pair of spectacles comprising a pair of lenses held by the respective lens frames, a side extending backwardly from each of said lens frames and balancing means for eliminating or reducing the load on the nose of a user. Therefore, the spectacles of the present invention requires no or substantially no bridge means for supporting the weight of the spectacles on the nose of the user.

15 Claims, 5 Drawing Sheets

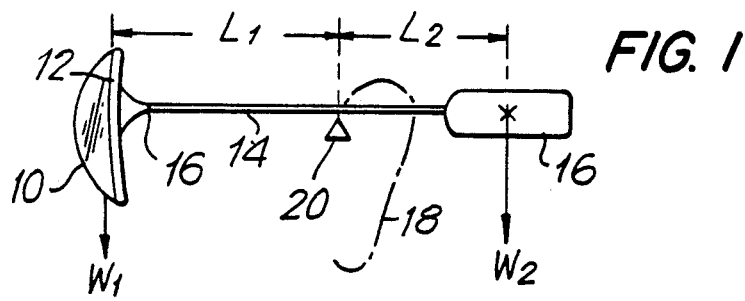
FIG. 1
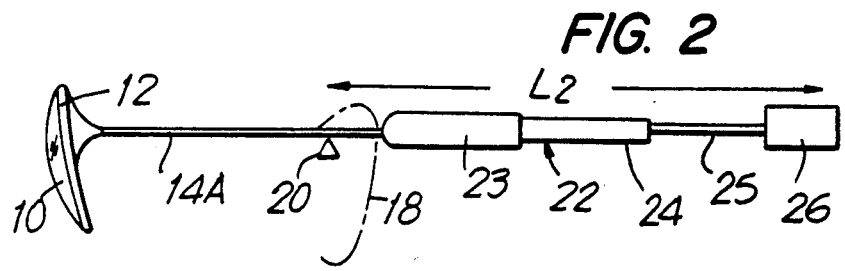
FIG. 2
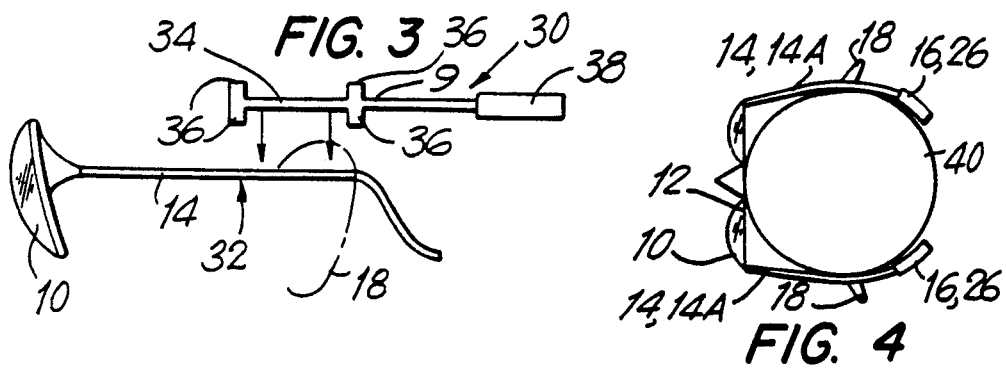
FIG. 3
FIG. 4
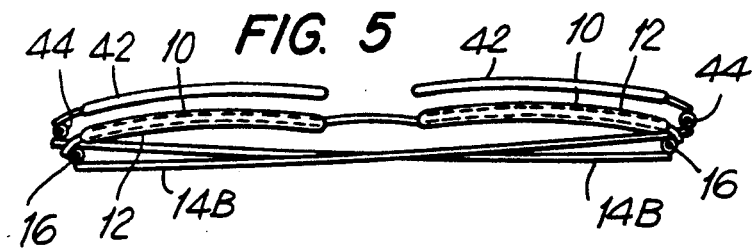
FIG. 5
FIG. 6

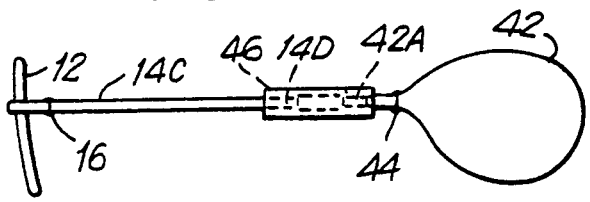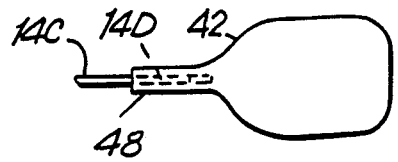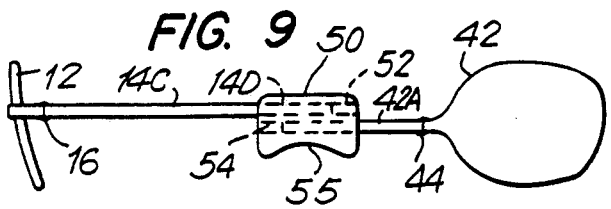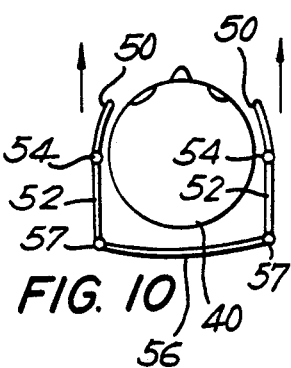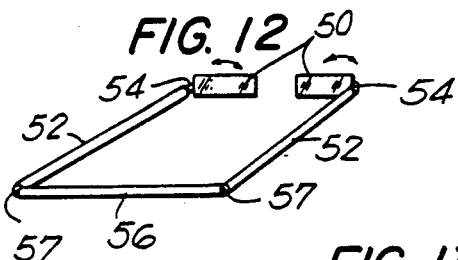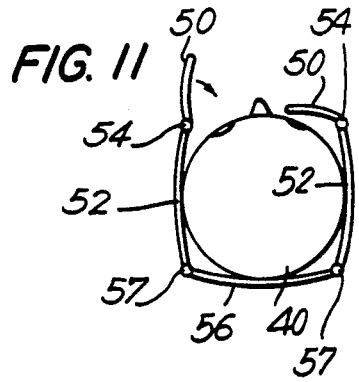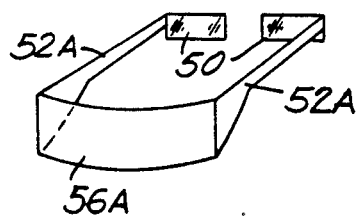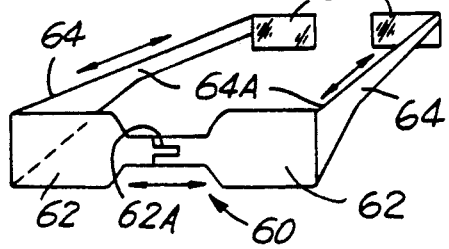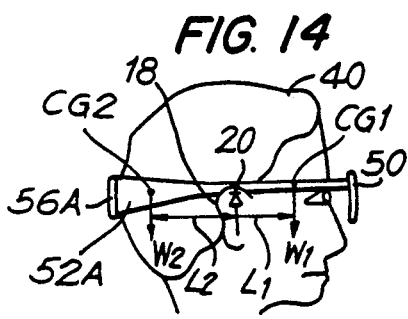

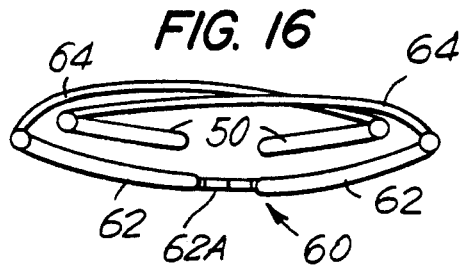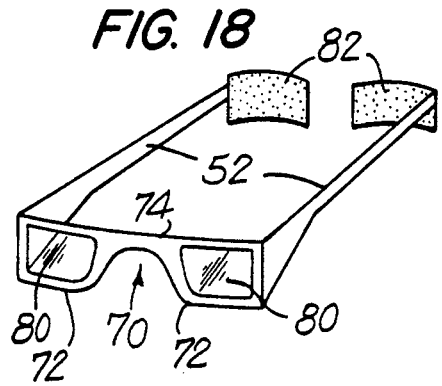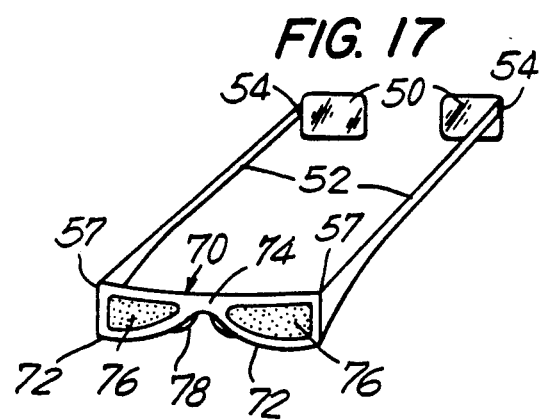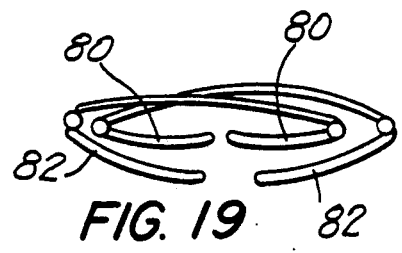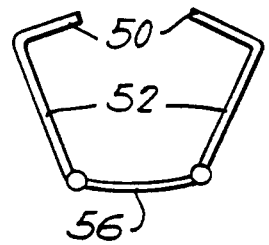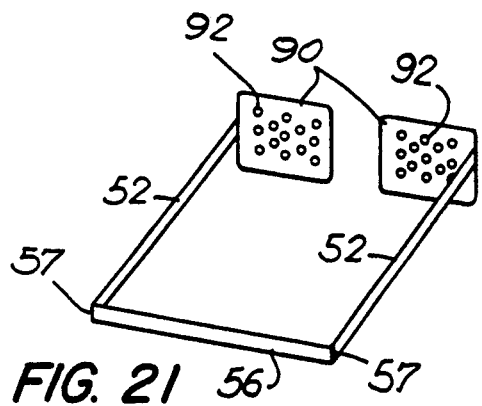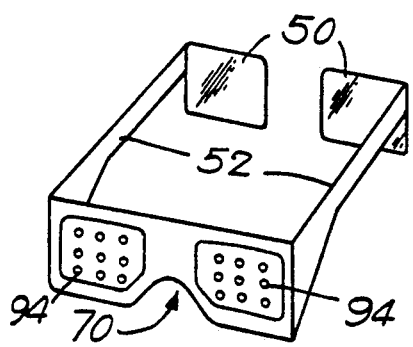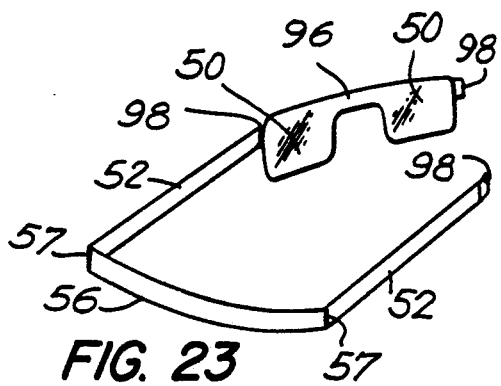

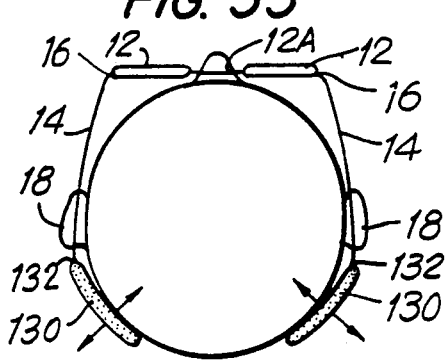
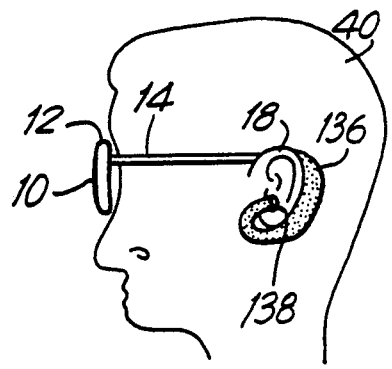
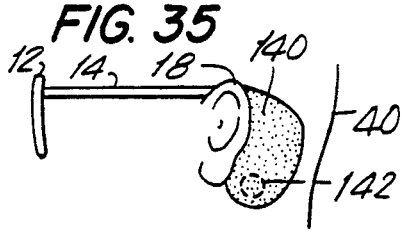
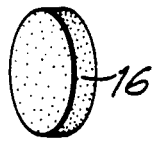
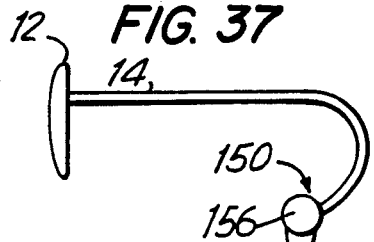
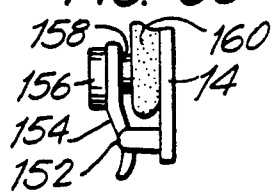
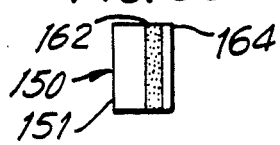
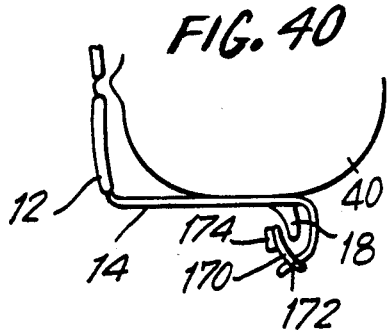
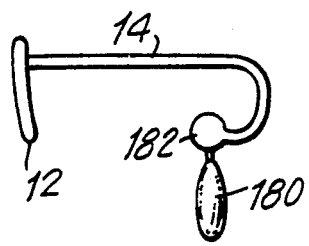
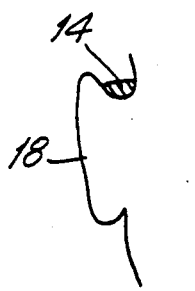
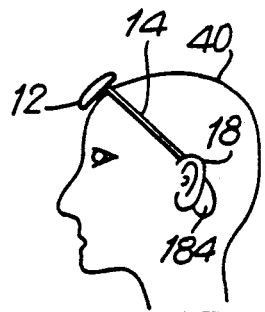

SPECTACLES HAVING REARWARD SECURING MEMBERS

This is a division of application Ser. No. 317,312, filed Mar. 1, 1989 now abandoned.

BACKGROUND OF THE INVENTION

1. Field of the Invention

The present invention relates to new spectacles or glasses.

2. Description of the Prior Art

The conventional spectacles generally comprises a pair of spectacle lenses each supported by a lens frame, bridge means for connecting the lens frames with each other and for supporting the weight of the spectacles on the user's nose, and a side pivotally connected with each of the lens frames and extending backwardly so that it can be placed on the top of the ear of a user to hold the spectacles against the user's head.

Since the weight of the spectacles is substantially exerted on the user's nose, it is frequent that the user is made unpleasant.

SUMMARY OF THE INVENTION

It is therefore an object of the present invention to provide new spectacles or glasses which will exert no or substantially no weight of the spectacles on the nose of the user.

To this end, the present invention provides a pair of spectacles or glasses which comprises means for balancing the weight of the spectacles such that the load on the nose will be eliminated or reduced.

In one aspect of the invention, the balancing means comprises a counter-weight mounted on the backward end of each of the spectacle sides.

In another aspect of the present invention, the balancing means comprises a backward member for connecting the backward end of the spectacle sides with each other.

In such an arrangement, the load on the user's nose can be remarkably reduced or completely eliminated. In some preferred embodiments of the invention, the bridge connecting the lens frames with each other can be omitted.

BRIEF DESCRIPTION OF THE DRAWINGS

The present invention will now be described with reference to the drawings in connection with various embodiments of the present invention. It is to be understood that similar parts are denoted by similar reference numerals throughout the drawings in which:

FIG. 1 is a side view showing one preferred embodiment of a pair of spectacles constructed according to the present invention.

FIG. 2 is a side view similar to FIG. 1, showing the spectacles under another condition.

FIG. 3 is a side view showing a modification of the spectacle shown in FIGS. 1 and 2.

FIG. 4 is a top view of the head of a user on which the spectacles of the present invention shown in FIGS. 1 and 2 is worn.

FIG. 5 is a plan view showing another preferred embodiment of the spectacles according to the present invention in a position that the spectacles are folded or closed into their unused state.

FIG. 6 is a plan view showing the spectacles only on one side, which is opened into its used state.

FIG. 7 is a side view of the spectacles shown in FIGS. 5 and 6.

FIG. 8 is a side view showing a modified connection between each spectacle side and the corresponding counter-weight means.

FIG. 9 is a side view showing a further modified connection between each spectacle side and the corresponding counter-weight means.

FIG. 10 is a top view showing the user's head on which still another embodiment of the spectacles according to the present invention is being worn.

FIG. 11 is a top view similar to FIG. 10, showing the spectacles being mounted into its use state.

FIG. 12 is a perspective view of the spectacles shown in FIGS. 10 and 11.

FIG. 13 is a view similar to FIG. 10, showing a modification of the spectacles shown in FIGS. 10, 11 and 12.

FIG. 14 is a side view of a further embodiment of the spectacles constructed according to the present invention.

FIG. 15 is a perspective view of the spectacles shown in FIG. 14.

FIG. 16 is a plan view of the spectacles shown in FIGS. 14 and 15 when they are folded into their unused state.

FIG. 17 is a perspective view showing a modification of the spectacles shown in FIGS. 14, 15 and 16.

FIG. 18 is a perspective view showing a further modification of the spectacles shown in FIGS. 14, 15 and 16.

FIGS. 19 and 20 are plan views respectively showing further modifications of the spectacles shown in FIGS. 14 through 17, which can be folded in different manners.

FIG. 21 is a perspective view of a further modification of the spectacles according to the present invention.

FIG. 22 is a perspective view of a still further modification of the spectacles according to the present invention.

FIG. 23 is a perspective view of a further modification of the spectacles according to the present invention.

FIG. 33 is a plan view of the spectacles shown in FIG. 32.

FIG. 34 is a side view showing a modification of the spectacles shown in FIGS. 32 and 33.

FIG. 35 is a side view showing another modification of the spectacles shown in FIGS. 32 and 33.

FIG. 36 is a perspective view showing a modified counter-weight preferably used in the present invention.

FIG. 37 is a side view illustrating a further embodiment of the spectacles according to the present invention.

FIG. 38 is a side view of the balancing member shown in FIG. 37.

FIG. 39 is a side view illustrating the details of the earring used in the balancing member of FIGS. 37 and 38.

FIG. 40 is a fragmentary plan view of a further embodiment of the spectacles according to the present invention.

FIG. 41 is a fragmentary plan view of a further embodiment of the spectacles according to the present invention.

FIG. 42 is a fragmentary longitudinal cross-section of a further embodiment of the spectacles according to the present invention.

FIG. 43 is a side view showing a further embodiment of the spectacles according to the present invention when they are shifted into their unused position.

DETAILED DESCRIPTION OF THE PREFERRED EMBODIMENTS

Figure 24:
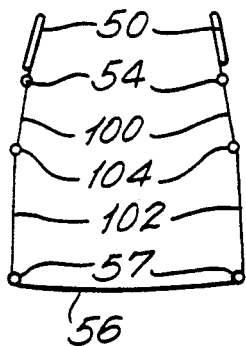
FIG. 24 is a plan view of a further modification of the spectacles according to the present invention in its fully opened state, which can be closed into their unused state in a different manner.

Referring first to FIG. 1, there is shown a pair of spectacles which comprises a pair of spectacle lenses 10 (only one shown) respectively held by lens frames 12, a straight side 14 pivotally connected with each of the lens frames 12 and extending backwardly therefrom, and a counter-weight or balancing element 16 rigidly connected with the backward end of each of the sides 14.

In such an arrangement, the spectacles can be worn on the head of a user at the top of the user's ears 18 such that the weight of the spectacles will be balanced about a point 20 on each ear 18. This may be explained by the following formula:

$$W_1 \times L_1 = W_2 \times L_2$$

where $W_1$ is a weight of each of the lenses 10; $L_1$ a distance between the fulcrum point 20 and each lens 10; $W_2$ a weight of each of the counter-weights 16; and $L_2$ a distance between the fulcrum 20 and each of the counter-weights 16.

As will be appreciated, the moment of the spectacles about the fulcrum 20 can be adjusted by increasing or decreasing the distance $L_2$ between the fulcrum 20 and each of the counter-weights 16. In such a manner, the load on the user's nose can be nullified.

Referring now to FIG. 2, there is shown a pair of spectacles having the same construction as in FIG. 1 except having an extendable spectacle side 14A that is pivotally connected with each of the lens frames 12. The extendable spectacle side 14A includes a telescopic section 22 connected with the backward end thereof. The telescopic section 22 comprises a plurality of nested portions (three in the illustrated embodiment) 23, 24 and 25. with the most-backward nested portion 24 being connected with a counter-weight 26. The length of the telescopic section 22 can be adjusted depending on the weight of the spectacles and/or the position of the user's ears. The variation of the length of the telescopic section 22 permits the counter-weight 26 to be reduced in weight or size. The telescopic section 22 can be contracted when the spectacles are not used.

FIG. 3 shows a modification of the spectacles according to the present invention, in which a balancing member 30 is mounted on the conventional spectacles 32. The balancing member 30 comprises an elongated support portion 34 having four tabs 36 laterally extending therefrom at the opposite sides and a counter-weight 38 rigidly connected with the support portion 34 at the backward end thereof. To mount the balancing member 30 on the conventional spectacles 32, the balancing member 30 is applied to each of the spectacle sides 14 and all the four tabs 36 thereon are then turned in against the inner face of the side 14 to secure the balancing member 30 against the conventional spectacles 32. Any adhering tape or the like may be used to support the balancing member 30 on the spectacles 32 more securely.

As shown in FIG. 4, each of the spectacle sides 14 or 14A may be curved inwardly against the user's head 40 at the counter-weight 16 or 26 to be compatible with the curvature of the user's head.

Referring now to FIGS. 5 and 6, there is shown a further embodiment of the spectacles according to the present invention, which comprises a pair of lenses 10 respectively held by lens frames 12, a spectacle side 14B pivotally connected with each of the lens frames 12 at 16, and a counter-weight or balancing member 42 pivotally connected at 44 with the backward end of each of the spectacle sides 14B. In this embodiment, the balancing member 42 also serves as a cover for protecting the respective lens 10 when the spectacles are folded into the unused state. The cover 42 is preferably made of a soft material such as plastics or rubber and/or formed to have a relatively extended shape. At this time, the cover or balancing member 42 will engage the user's head more softly while stabilizing the spectacles on the user's head.

In the embodiment of FIGS. 5 and 6, the lens cover 42 may have its weight which does not function as a balancing counter-weight as in the previous embodiments, since the lens cover 42 can engage the user's head to hold the spectacle more securely without load on the user's nose.

FIG. 7 shows a modification of the spectacles shown in FIGS. 5 and 6, which comprises a resilient connecting tube 46 for connecting the backward cut end 14D of each of the spectacle side 14C with the forward cut end 42A of the corresponding lens cover 42. The length of each of the side sections in the spectacles can be adjusted by moving the cut ends of the side and cover relative to each other within the connecting tube 46.

FIG. 8 shows another modification which comprises a connecting tube 48 formed integrally in the forward portion of the lens cover 42. The connecting tube 48 receives the backward cut end 14D of each of the spectacle side 14C to secure it on the spectacles. Also at this case, the length of the side section can by adjusted by moving the backward cut end 14D of the spectacle side 14C within the connecting tube 48.

In FIG. 9, the backward cut end 14D of each of the spectacle sides 14C is connected with the forward cut end 42A of the lens cover 42 through a connecting tube 50. The connecting tube 50 is formed with two through-holes 52 and 54 spaced away from one above another and parallel to each other. Each of these through-holes 52 or 54 receives the corresponding cut ends of the spectacle side or lens cover. The length of the side sections in the spectacles can be adjusted by moving the cut ends of the respective parts within the connecting tube 50. The connecting tube 50 also includes a curved bottom 55 formed therein which is adapted to be placed on the top of the user's ear.

Referring now to FIGS. 10, 11 and 12, there is shown a further embodiment of the present invention, in which an improved pair of spectacles comprises a pair of lenses 50 each pivotally connected at 54 with the forward end of each of spectacle side 52, and a backward connecting member 56 pivotally connected between the backwards ends of the spectacle sides 52 at pivots 57. Such an arrangement requires no bridge for connecting between the spectacle lenses.

On use, the spectacles are mounted backwardly on the user's head 40 and then the lenses 50 are turned inwardly about the respective pivots 54 to place on the appropriate front of the user's face.

FIGS. 13 and 14 illustrates a modification of the spectacles shown in FIGS. 10 through 12, in which the backward connecting member 56A and the backward ends portion of the spectacle sides 52A are widened. The distribution of weight in the spectacles is so designed that when the spectacles are worn on the user's head 40 as shown in FIG. 14, the aforementioned formula, $L_1W_1 = L_2W_2$, is fulfilled where $W_1$ is a weight on the center of gravity CG1 in the side section between the fulcrum 20 on the ear 18 and the corresponding lens 50; $W_2$ a weight on the center of gravity CG2 in the side section between the fulcrum 20 and the backward connecting member 56A; $L_1$ a distance between the fulcrum 12 and the center of gravity CG1 and $L_2$ a distance between the fulcrum 12 and the center of gravity CG2. In such a case, the weight of the spectacles about the fulcrums 12 on the user's ears 18 can be appropriately balanced without any bridge which would be required to support the spectacles on the user's nose in the prior art.

FIGS. 15 and 16 shows a further modification of the spectacles shown in FIGS. 10 through 14, in which a backward connecting member 60 is divided into two backward sections 62. These backward sections 62 are connected with each other through an extendable connection 62A such that the length of the backward connecting member 60 can be adjusted to accommodate the size of the user's head. It is also preferred that each of the spectacle sides 64 is formed to extend its length through a extendable connection 64A. It is further preferred that each of the backward sections 62 is of substantially the same size and shape as those of each lens 50. In such a case, when the spectacles are folded into their unused state, the backward sections 62 can cover and protect the spectacle lenses 50.

A pair of spectacles shown in FIG. 17 has substantially the same construction as that of the spectacles shown in FIGS. 10 through 13 except that the backward connecting member 70 is divided into two backward lens frames 72 which are connected with each other through a bridge 74. Each of the backward lens frames 72 holds a colored lens 76. The spectacles also has pad bridges 78 each of which is formed integrally with the corresponding backward lens frame 72.

The spectacles shown in FIGS. 17 can be used as a pair of sunglasses in the opposite manner as in FIG. 14. In other words, the backward connecting member 70 can be placed on the front of the user's face as in the conventional glasses. At this time, it is of course that the spectacles of the present invention is used through the bridge 74 and the pad bridges 78 in the same manner as in the conventional spectacles.

FIG. 18 shows the opposite arrangement as that of the spectacles shown in FIG. 17. In other words, the colored lenses 76 held by the backward lens frames 72 are placed by transparent lenses 80 while the forward transparent lenses 50 are replaced by colored lenses 82.

FIG. 19 shows the spectacles of FIG. 18 when they are folded into their unused state in a different manner as that of the spectacles shown in FIG. 16. That is, the lenses 80 on the backward connecting member 70 are covered by the forward lenses 82.

FIG. 20 shows a modification of the spectacles as shown in FIG. 12, in which each of the forward lenses 50 is connected integrally with the respective one of the spectacle sides 52 which in turn is pivotally connected with the backward connecting member 56.

FIG. 21 shows a further modification of the spectacles according to the present invention, which is different from the spectacles shown in FIGS. 10 to 12 only in that the forward lenses are replaced by colored lenses 90 including a plurality of transparent portions 92 in the form of small apertures.

FIG. 22 shows a further modification in which the colored lenses shown in FIG. 17 are replaced by the same colored lenses 94 as the colored lenses 90 shown in FIG. 21.

FIG. 23 shows the same arrangement as that of the spectacles shown in FIGS. 10 to 12, except that the forward lenses 50 are rigidly connected with each other through a central connection 96 to form a forward lens assembly. The forward lens assembly is pivotally connected at one end with one of the spectacle sides 52, the other end of the forward lens assembly being detachably connected with the other spectacle 52 as through a hook-latch connection 98.

Figure 25:
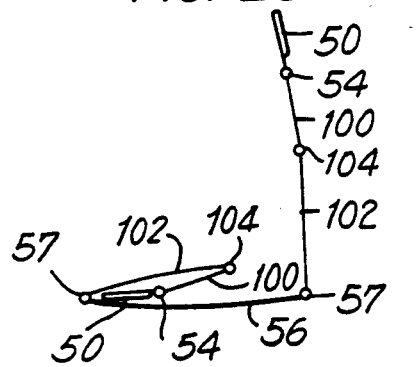
FIG. 25 is a view similar to FIG. 24, showing the spectacles being folded into its unused state.
Figure 26:
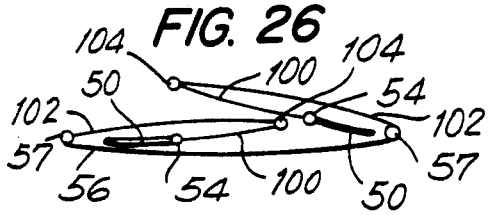
FIG. 26 is a view similar to FIGS. 24 and 25, showing the spectacles which has been substantially completely closed into their unused state.

FIG. 24 shows a further modification of the spectacles as shown in FIGS. 10 to 12, in which each of the spectacle sides 52 is divided into two side sections 100 and 102. The side sections 100 and 102 are pivotally connected with each other through a pivot 104. As can be seen from in FIGS. 25 and 26, such spectacles can be folded into a more compact state than those of the previous embodiments.

Figure 27:
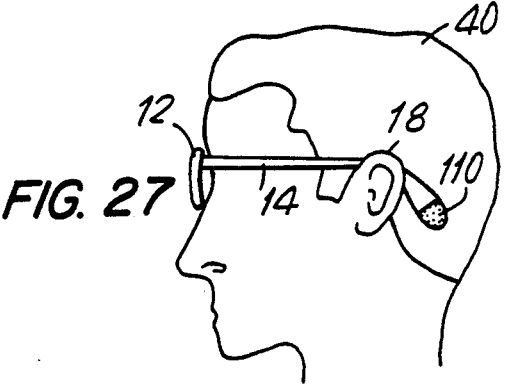
FIG. 27 is a side view showing a further embodiment of the spectacles according to the present invention in its used state wherein it is worn on the user's head.

Referring now to FIG. 27, there is shown a pair of spectacles having substantially the same construction as shown in FIGS. 1 through 4, except that a flat permanent magnet 110 is mounted on the backward end of each of the spectacle sides 14. Such a permanent magnet 110 may influence the flow of blood within the user's head 40 near his ear 18.

Figure 28:
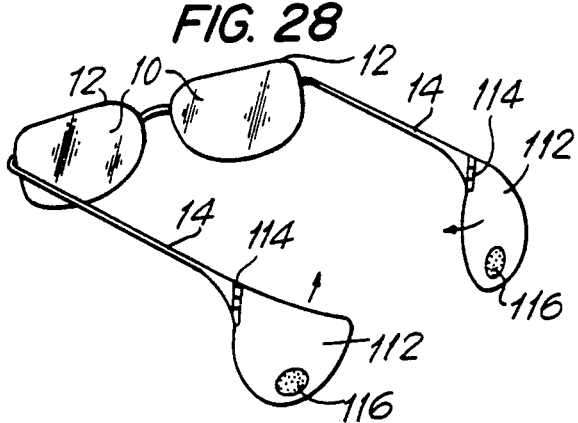
FIG. 28 is a perspective view showing a modification of the spectacles shown in FIG. 27.

FIG. 28 shows a modification of the spectacles shown in FIG. 27 in which the spectacles have a flat pad 112 pivotally connected with the backward end of each of the spectacle sides 14 through a hinge 114. When such spectacles are worn on the user's head, each of the pads 112 are turned against the user's head about the respective hinge 114 to hold the spectacles on the user's head more securely. It may be preferred that a permanent magnet 116 is mounted on each of the pads 112.

Figure 29:
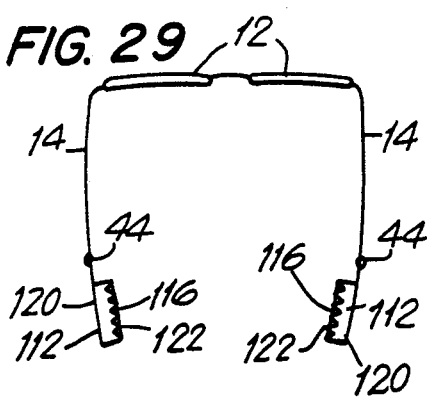
FIG. 29 is a plan view showing another modification of the spectacles shown in FIGS. 27 and 28.
Figure 30:
FIG. 30 is a perspective view of the counter-weight used in the spectacles of FIG. 29.

Referring to FIGS. 29 and 30, each of the permanent magnets 116 to be mounted on the respective pad 112 may be located within a crown-shaped receptacle 120. The receptacle 120 has a plurality of sawteeth 122 formed thereon at its opened edge.

Figure 31:
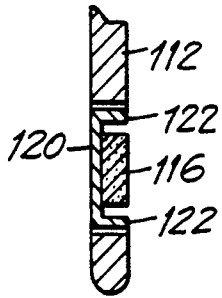
FIG. 31 is a cross-sectional view showing the backward end of one side of the spectacles in which a modified counter-weight is mounted.

Such an assembly consisting of the magnet 116 and the receptacle 120 may be embedded in each of the pads 112, as shown in FIG. 31.

In such an arrangement, the magnet assembly can increase the strength of the magnetic field created between the magnet 116 and the receptacle 120 while providing a mechanical stimulus to the user's head. Furthermore, any slippage between the backward ends of the spectacle sides and the user's head can be reduced by the magnet assemblies in the pads 112.

Figure 32:
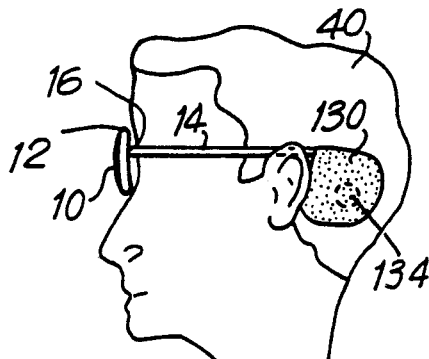
FIG. 32 is a side view showing a further embodiment of the spectacles according to the present invention.

FIGS. 32 and 33 show a pair of spectacles similar to those shown in FIG. 28, in which they comprise a pair of lenses 10 held by the respective lens frames 12, a bridge 12A connecting the lens frames 12 with each other and a pair of spectacle sides 14 each pivotally coupled at 16 with one of the lens frames 12. In this embodiment, a soft pad 130 is pivotally connected at 132 with the backward end of each of the spectacle sides 14. When the spectacles are worn on the user's head at his ears 18, the soft pads 130 are turned inwardly against the user's head 40 such that the inward face of each of the soft pads 130 will engage a recess 134 in the backward neck portion of the user's head 40. This assures that the entire weight of the spectacles can be supported by the soft pads 130 without any load on the user's nose. It may be preferred that each of the soft pads 130 is resiliently biased against the user's head under the action of any suitable spring means (not shown).

Furthermore, each of the soft pads 130 may include a counter-weight (not shown) embedded therein or a battery (not shown) which can supply a power to any electric equipment such as liquid crystal layers used to control the transparency in the lenses.

FIG. 34 shows a modification of the spectacles shown in FIGS. 32 and 33, in which a soft pad 136 connected with the backward end of each of the spectacle sides 14 is coiled with the free end thereof engaging a recess 138 in each of the user's ears 18. Thus, the spectacles can be supported more securely on the user's head.

FIG. 35 shows a further modification of the spectacles shown in FIGS. 32 through 34, in which a soft pad 140 connected with the backward end of each of the spectacle sides 14 extends further downwardly along each of the user's ears 18. The bottom end of each of the soft pads 140 includes a permanent magnet 142 embedded therein, which may influence the flow of blood under the skin of the user's head 40.

Referring now to FIGS. 37, 38 and 39, there is shown a balancing member 150 also serving as a decorative and holding member. The balancing member 150 includes a stub 152 rigidly connected with the backward curved end of each of the spectacle sides 14. A clamp 154 is pivotally connected with the outward end of the stub 152 and resiliently biased against the spectacle side 14 under the action of spring means (not shown). An earring 156 is rigidly mounted on the outer face of each of the clamps 154. As shown in FIG. 39, each of the earring 156 may include a decorative element 151 which can take a combination of various sizes, shapes and colors, a pressure-sensitive adhesive layer 162 which can be used to adhere that decorative element to the outer face of each of the clamps 154. When the decorative element 151 is unused, a release liner 164 is applied over the pressure-sensitive adhesive layer 162.

The balancing member 150 is utilized to hold the spectacles against the user's head when the earlobe 160 of each of the user's ears is held between the clamp 154 and the backward end of the respective spectacle side. At this time, any suitable decorative element 156 may be attached to each of the clamps 154. It may be further preferred that a permanent magnet 158 is mounted on the inner face of each of the clamps 154. Such a permanent magnet 158 serves to promote the flow of blood in the user's head and also to support the spectacles on the user's head in addition to the clamps 154 holding the spectacles.

FIG. 40 shows a modification of the spectacles shown in FIGS. 37 to 39, in which the backward end of each of the spectacle sides 14 is turned outwardly to extend behind the user's ear. The tip of the spectacle side is spaced laterally from the corresponding ear of the user when the spectacles are worn on the user's head 40. A clamp 170 is pivotally mounted on the tip of the spectacle side 14 and resiliently biased against the portion of the spectacle side just behind the tip thereof.

This arrangement functions to displace the outer edge of the user's ear 18 outwardly such that any external sound may be taken by that ear more clearly. Since the outer edge of the user's ear is held between the clamp 170 and the backward end of the spectacle side 14, the user cannot be made unpleasant.

Any suitable decorative element 174 may be removably attached to the outer face of each of the clamps 170.

FIG. 41 shows a still further modification of the spectacles shown in FIGS. 37 to 39, in which a decorative element 180 is supported from the rounded tip of the U-shaped backward end of each spectacle side 14. The decorative element 180 serves as a balancing member or counter-weight in the spectacles.

As shown in FIG. 42, it is preferred that the spectacles of the present invention has two sides 14 each of which is of a flat rectangular cross-section since such cross-section applies a gentle pressure against the tops of the user's ears 18.

The spectacles having its balancing members on the backward ends of the spectacle sides 14 may be held at a position in which the forward lens frames 12 are located adjacent to the top of the user's head 40, under the influence of the balancing members 184.

In accordance with the present invention, further, any suitable electric equipment such as hearing aid, audiophone, radio receiver or the like may be embedded in the pad connected with the backward end of the spectacle side.

I claim:

1. Eyeglass frames comprising a pair of elongated generally parallel side members adapted to be disposed at the sides of the head of a person wearing said eyeglass frames, each of said side members having a front end and a rear end, lens support means adapted to support lenses, said lens support means being connected to said front end of each of said side members, generally flat earpieces pivotably connected to said rear ends of said side members, a generally cylindrical receptacle mounted on each of said earpieces, said cylindrical receptacle having a cylindrical axis generally perpendicular to said generally flat earpiece, said cylindrical receptacle having an inner end which is closed off and an outer end which is open and which is adapted to be disposed juxtaposed to the part of said person's head located behind said person's ear, and a magnet means disposed within said cylindrical receptacle.

2. Eyeglass frames according to claim 1, wherein said outer open end of said cylindrical receptacle has a plurality of generally triangularly shaped projections.

3. Eyeglass frames according to claim 1, wherein said each of said earpieces has an inner and an outer generally flat surface, each of said earpieces having an opening for receiving said cylindrical receptacle such that said outer open end of said receptacle is generally flush with said inner flat surface of said earpiece.

4. Eyeglass frames according to claim 3, wherein said cylindrical receptacle has a bottom wall which closes off said inner end of said cylindrical receptacle, said bottom wall having an outer surface which is generally flush with said outer surface of said earpiece.

5. Eyeglass frames comprising a pair of elongated generally parallel side members adapted to be disposed at the sides of a person's head wearing said eyeglass frames, each of said side members having a front end and a rear end, lens support means adapted to support lenses, said lens support means being connected to said front end of each of said side members, said rear end of each of said side members having a triangular portion in which one side of the triangular portion is generally parallel to the respective side member and another side of said triangular portion is generally perpendicular to said one side of said triangular portion, a generally flat pad having a forward side juxtaposed to said other side of said triangular portion of said side member, said forward side of said flat pad and said other side of said triangular portion of said side member each being generally vertically disposed when said eyeglass frames are worn by said person, and vertically disposed hinge means pivotably connecting said other side of said triangular portion with said forward side of said pad such that said pad is pivotable about a generally vertical axis, said hinge means being disposed behind and to the rear of the ear of a person wearing said eyeglass frames such that said pad is pivotable inwardly behind said person's ear to closely conform to the shape of the part of a person's head behind the ear.

6. Eyeglass frames comprising a pair of elongated generally parallel side members adapted to be disposed at the sides of the head of a person wearing said eyeglass frames, each of said side members having a front end and a rear end, lens support means adapted to support lenses, said lens support means being connected to said front end of each of said side members, said rear end of each of said side members being disposed behind and to the rear of a person's ear when said eyeglasses are worn by said person, generally flat soft pad members juxtaposed to said rear ends of said side members, and vertically disposed pivot means pivotably mounting said pad members on said rear ends of said side members for pivotal movement about generally vertical axes when said eyeglass frames are being worn by said person, said hinge means being disposed behind and to the rear of the ear of the person wearing said eyeglass frames such that said pad members are pivotable behind said person's ear to a position conforming generally to the contour of the part of said person's head located behind the ear.

7. Eyeglass frames comprising a pair of elongated generally parallel side members adapted to be disposed at the sides of the head of a person wearing said eyeglass frames, each of said side members having a front end and a rear end, lens support means adapted to support lenses, said lens support means being connected to said front end of each of said side members, soft pad members connected to said rear end of each of said side members, each of said soft pad members having a generally reverse C-shaped configuration having a first and a second end section, said first end section of said reverse C-shaped pad member being connected to said rear end of said side member, said reverse C-shaped pad member passing behind and below said person's ear, said second end section of said reverse C-shaped pad member extending upwardly from below and in front of said person's ear and thence generally rearwardly to a position juxtaposed to said person's ear opening, said second end section of said reverse C-shaped pad member having a transverse part extending into said person's ear opening to thereby securely support the eyeglass frames on the head of a person wearing said eyeglass frames.

8. Eyeglass frames comprising a pair of elongated generally parallel side members adapted to be disposed at the sides of the head of a person wearing said eyeglass frames, each of said side members having a front end and a rear end, lens support means adapted to support lenses, said lens support means being connected to said front end of each of said side members, earpieces connected to said rear ends of said side members, said earpieces having a generally reverse C-shaped configuration so as to extend behind and below a person's ear such that an end section of said earpiece is disposed to generally underlie said person's earlobe, and clamping means mounted on said end section of said earpiece for clamping said person's earlobe, said clamping means comprises a stud member fixed to and extending from said end section of said earpiece, and a clamp member pivotably mounted on said stud and biased to a pivotal position to clamp said person's earlobe between said clamp member and said end section of said earpiece.

9. Eyeglass frames according to claim 8, wherein said clamp member extends generally vertically upwardly from said stud member.

10. Eyeglass frames according to claim 8, wherein said stud member extends generally laterally outwardly and generally perpendicular to the side of said person's head.

11. Eyeglass frames according to claim 8 further comprising a decorative member, and adhesive means mounting said decorative member on said clamp member.

12. Eyeglass frames according to claim 11 further comprising a magnet means mounted on said clamp member, said clamp member having an inside and an outside, said inside being closer to said person's earlobe than said outside, said decorative member being mounted on said outside of said clamp member, said magnet means being mounted on said inside of said clamp member.

13. Eyeglass frames comprising a pair of elongated generally parallel side members adapted to be disposed at the sides of the head of a person wearing said eyeglass frames, each of said side members having a front end and a rear end, lens support means adapted to support lenses, said lens support means being connected to said front end of each of said side members, earpieces connected to said rear ends of said side members, said earpieces extending generally laterally outwardly away from the sides of said person's head, said earpieces having end portions disposed laterally outwardly of said person's ear, and clamping means pivotably and biasingly mounted on said end portions of said earpieces for clamping a portion of said person's ear between said clamping means and said end portion of said earpiece.

14. Eyeglass frames according to claim 13, wherein said earpieces have a generally reverse C-shaped configuration when viewed from above as said eyeglass frames are being worn by said person.

15. Eyeglass frames according to claim 13, wherein said clamping means is operable to hold said clamped part of said person's ear in a position extending generally laterally outwardly from said person's head.

* * * * *